R. ANDERSON.
MILK COOLER AND CREAM RECEPTACLE.
APPLICATION FILED OCT. 4, 1909.
956,021.
Patented Apr. 26, 1910.
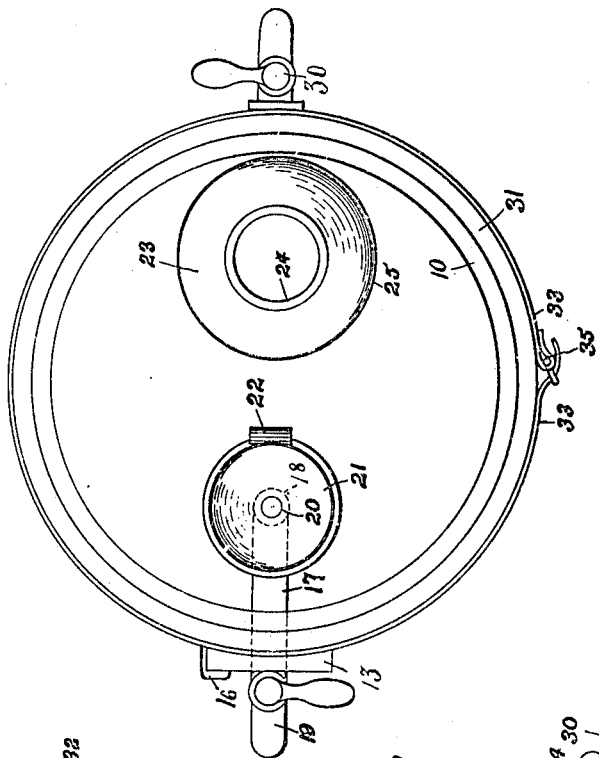
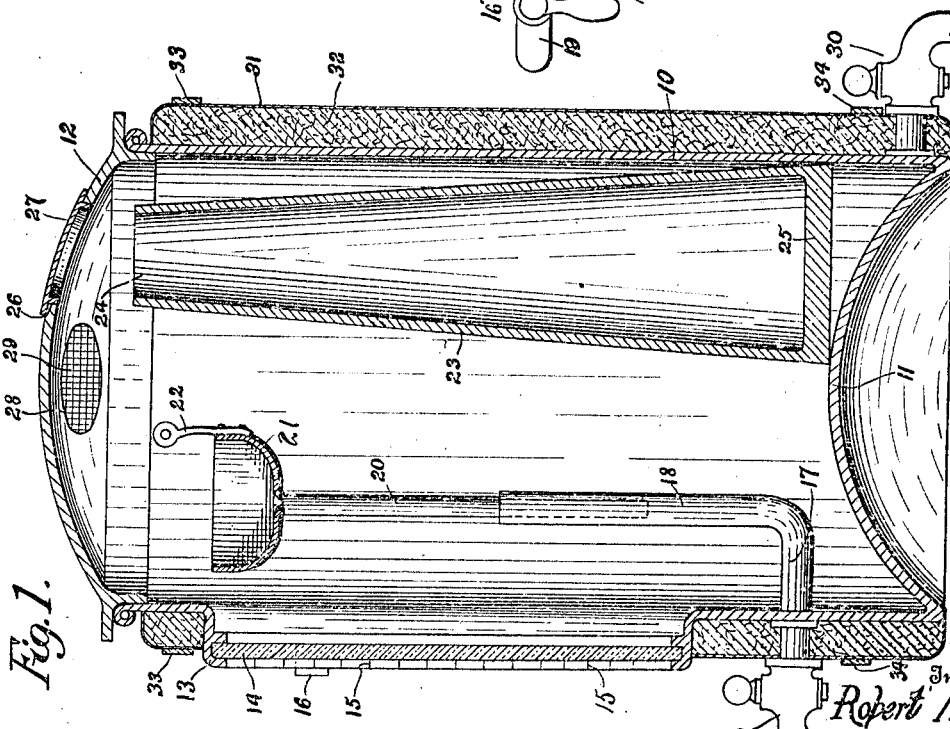
Witnesses
J. R. Woodworth
C. N. Woodward
Inventor
Robert Anderson
By Chandler & Chandler
Attorneys

UNITED STATES PATENT OFFICE.

ROBERT ANDERSON, OF SARCOXIE, MISSOURI, ASSIGNOR OF ONE-THIRD TO AUGUSTINE A. COX, OF STOTTS CITY, MISSOURI.

MILK-COOLER AND CREAM-RECEPTACLE.

956,021.  Specification of Letters Patent. Patented Apr. 26, 1910.

Application filed October 4, 1909. Serial No. 520,880.

*To all whom it may concern:*

Be it known that I, ROBERT ANDERSON, a citizen of the United States, residing at Sarcoxie, in the county of Jasper, State of Missouri, have invented certain new and useful Improvements in Milk-Coolers and Cream-Receptacles; and I do hereby declare the following to be a full, clear, and exact description of the invention, such as will enable others skilled in the art to which it appertains to make and use the same.

This invention relates to devices for cooling milk and separating the cream therefrom, and has for one of its objects to improve the construction and increase the efficiency and utility of devices of this character.

With this and other objects in view, the invention consists in certain novel features of construction as hereafter shown and described and then specifically pointed out in the claim, and in the drawings illustrative of the preferred embodiment of the invention, Figure 1 is a vertical sectional view of the improved device. Fig. 2 is a plan view of the same with the cover removed.

The improved device comprises a receptacle 10 for the milk, preferably of sheet metal, and formed with an upwardly rising bottom 11 and a detachable cover 12. The vessel or receptacle 10 may be of any required size or capacity, and will preferably be formed of tin of the usual quality employed for vessels containing milk. Formed in one side of the receptacle 10 is a lateral projection 13 containing a transparent member 14, preferably of glass through which the condition of the contents of the vessel may be observed. Formed along one edge of the projection 13 are graduations 15, and slidably disposed upon the projection is an indicator 16, the graduations denoting the depth of the milk and cream, and the indicator denoting the line between the milk and the cream. By this means the condition of the contents of the receptacle may be readily ascertained.

Projecting through one side of the receptacle 10, preferably near its lower end, is a pipe 17 upturned within the receptacle as at 18 and with a discharge valve 19 at the outer end. Slidably disposed within the upturned portion 18 of the pipe 17 is a smaller pipe 20, the smaller pipe having a dish shaped upper terminal 21 in which the cream is received and discharged thence through the pipes 20—18—17 and drawn off through the valve 19. The smaller pipe 20 is thus telescopically engaged with the upturned portion 18, and fits the latter closely enough so that it will be retained in whatever position it may be adjusted by friction only. By this means the receiver 21 may be located at any desired point to conform to the depth of the cream to be removed.

The member 21 is provided with a lifting handle 22 by which it may be adjusted from above when the cover 12 is removed. Located within the receptacle 10 is a vessel 23 designed to hold the cooling element, such as ice or water, or the like. The vessel 23 is preferably formed converging toward its upper end 24 and increased in thickness or weight at its lower end as shown at 25, so that the vessel will retain its position in the receptacle and bearing upon the bottom 11, and will not be floated by the milk or cream. The open terminal of the vessel 23 will remain at all times above the milk or cream within the receptacle.

The lower end of the vessel 23 being the largest, and the sides sloping graduating inwardly, the inward pressure of the milk assists materially in retaining the vessel in its submerged position.

Formed in the cover 12 is an opening 26 through which the cooling element may be inserted into the vessel 23, the closure having a detachable cover 27. Formed in the cover 12 is an opening 28 provided with a screen 29 and through which the milk is inserted into the receptacle, and strained at the same time it is inserted. A draw-off valve 30 for the skimmed milk is connected to the receptacle 10 at its lower end as shown.

Surrounding the receptacle 10 is a mat of non-conducting material such as felt, mineral wool, or the like, the mat being preferably inclosed in a canvas covering 31, whereby the non-conducting material, which is represented at 32, is retained in position. The covering 31 is provided with straps 33—34 and buckles 35 whereby the mat may be readily connected in place and detached when not required, or when the receptacle is to be washed.

The improved device is simple in construction, can be inexpensively manufactured, and enables the cream to be readily and thoroughly separated from the milk with the expenditure of the minimum of labor and time.

When the cooling element requires replenishing or changing, the contents may be readily discharged by a flexible tube inserted through the opening 29 and employed as a siphon by disposing the discharge end of the tube below the line of the vessel 28, as will be understood.

What is claimed is:—

In a milk cooler, a receptacle for the milk, a detachable cover for said receptacle and having an aperture therein provided with a detachable closure, an ice receiver located within said receptacle and bearing upon the bottom thereof, and with the upper end open and spaced below the receptacle cover, the walls of the receiver being arranged to diverge toward the bottom end with the open upper end thereof located below the aperture of the cover whereby the receiver may be supplied with ice without removing it from the receptacle and the cover of the receptacle detached without disturbing the ice receiver.

In testimony whereof, I affix my signature, in presence of two witnesses.

ROBERT ANDERSON.

Witnesses:
   H. J. Jones,
   Peter Carter.